United States Patent
Friend et al.

[11] Patent Number: 6,045,137
[45] Date of Patent: Apr. 4, 2000

[54] RADIAL SEAL HAVING A METAL SUPPORT

[75] Inventors: Anthony D. Friend, Peoria; Joseph M. Vanecko, Metamora, both of Ill.

[73] Assignee: Caterpillar Inc., Peoria, Ill.

[21] Appl. No.: 09/024,044

[22] Filed: Feb. 16, 1998

[51] Int. Cl.[7] .................................................. F16J 15/32
[52] U.S. Cl. ............................................ 277/560; 277/565
[58] Field of Search ................................. 277/560, 562, 277/565, 568, 572

[56] References Cited

U.S. PATENT DOCUMENTS

| | | |
|---|---|---|
| 2,868,566 | 1/1959 | Kosatka . |
| 3,106,406 | 10/1963 | Liebig . |
| 3,330,605 | 7/1967 | Jasmand . |
| 3,743,305 | 7/1973 | Berens et al. . |
| 3,841,723 | 10/1974 | Kelso ................................. 308/187.1 |
| 4,141,563 | 2/1979 | Wu . |
| 4,166,628 | 9/1979 | Blaydon . |
| 4,174,845 | 11/1979 | Hadaway . |
| 4,289,321 | 9/1981 | Cather, Jr. . |
| 4,465,286 | 8/1984 | Deem et al. . |
| 4,537,409 | 8/1985 | Estes et al. . |
| 4,616,836 | 10/1986 | Drygalski et al. . |
| 4,789,166 | 12/1988 | Rericha et al. . |
| 4,863,292 | 9/1989 | Dreschmann et al. .................. 384/482 |
| 4,987,826 | 1/1991 | Deppert et al. . |
| 5,380,016 | 1/1995 | Reinsma et al. . |
| 5,431,415 | 7/1995 | Millonig et al. . |
| 5,460,678 | 10/1995 | Reinsma et al. ......................... 156/242 |
| 5,482,296 | 1/1996 | Peppiatt et al. . |
| 5,597,356 | 1/1997 | Rieder . |

FOREIGN PATENT DOCUMENTS

| | | |
|---|---|---|
| 0317903 | 11/1988 | European Pat. Off. ......... F16J 15/32 |
| 1531683 | 11/1968 | France . |
| 1449220 | 9/1976 | United Kingdom ............. F16J 15/32 |

*Primary Examiner*—Anthony Knight
*Assistant Examiner*—John L. Beres
*Attorney, Agent, or Firm*—J. W. Burrows; Maginot, Addison & Moore

[57] ABSTRACT

A radial seal arrangement is disclosed and adapted for use in providing a sealed surface with a shaft. The radial seal arrangement includes an elastomeric member and a metal support member bonded thereto. The elastomeric member includes a first sealing portion that is defined by a lip portion and a second sealing portion defined by a first surface extending at an acute angle from a perpendicular radial surface and a second surface that extends from and is generally perpendicular with the first surface. The metal support member includes a first leg that extends in a linear direction with respect to a reference axis of the seal arrangement and a second leg that extends generally along the perpendicular radial surface. The second leg of the metal support member terminating at a location generally adjacent to the first surface of the second sealing portion.

6 Claims, 2 Drawing Sheets

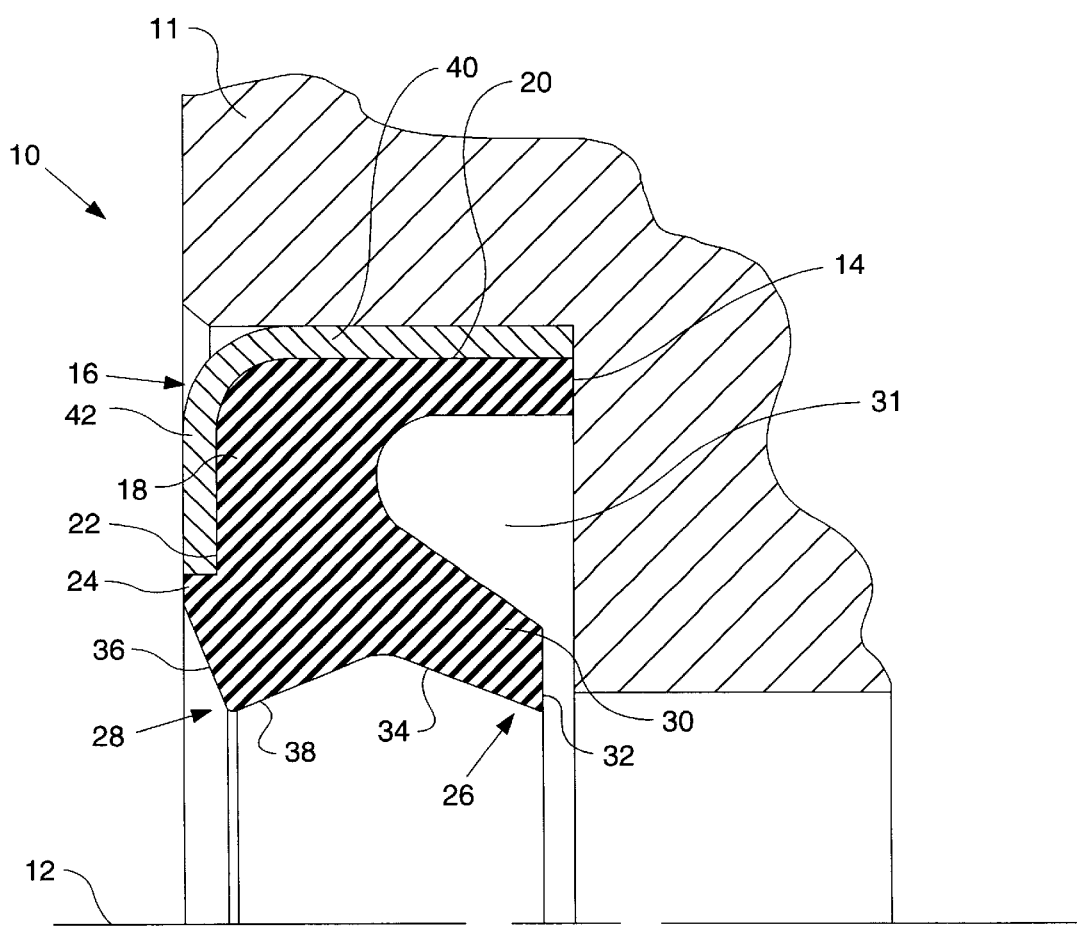

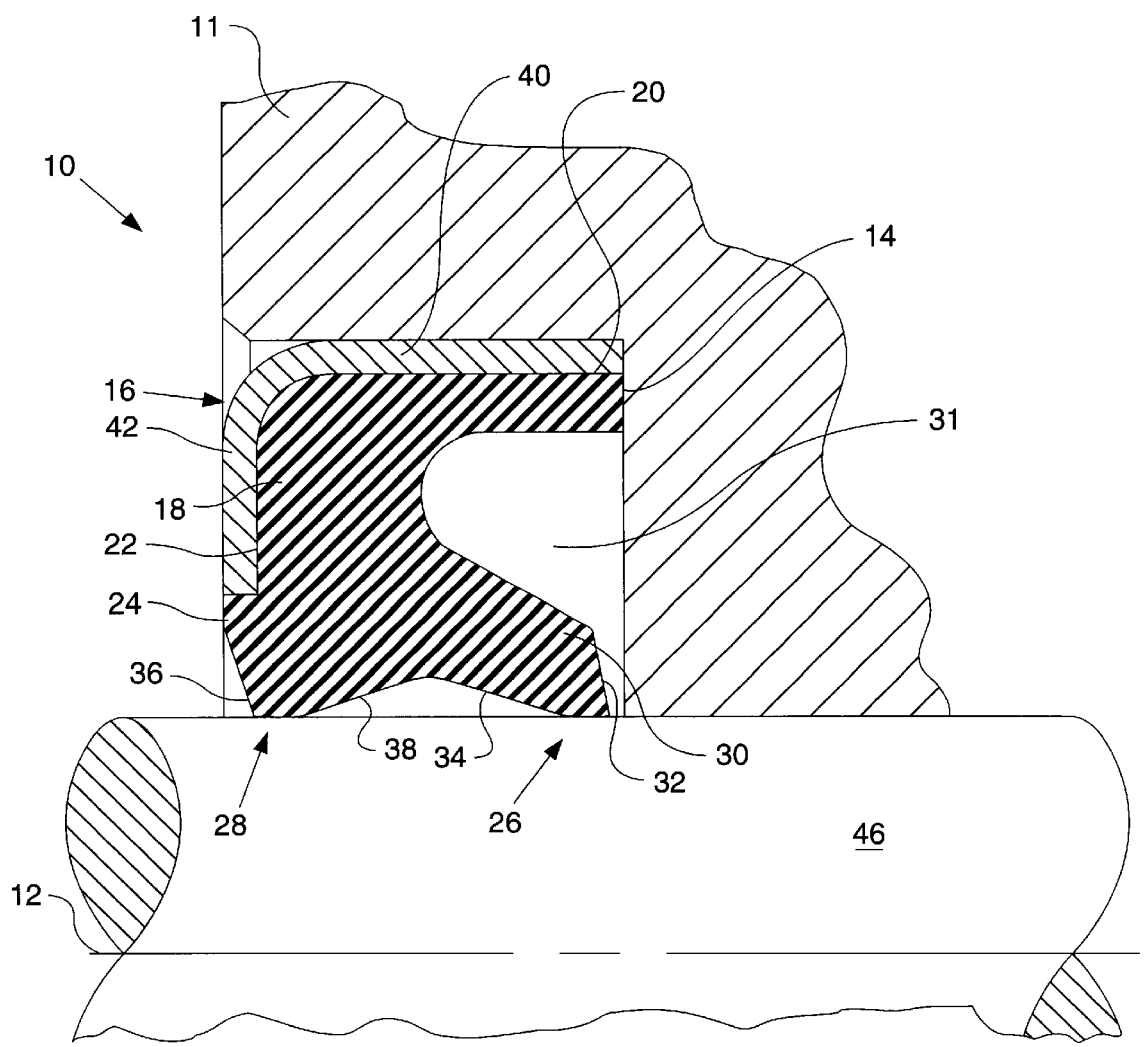

RADIAL SEAL HAVING A METAL SUPPORT

TECHNICAL FIELD

This invention relates generally to a radial seal for sealing a shaft (rod) and more particularly to a radial seal having first and second sealing portion and a metal support.

BACKGROUND ART

Radial seals are well known in the art. These seals have many different shapes and styles to fit various applications. Many of these seals have a flexible lip extending from a body portion and require special springs and/or elastomeric members to hold the lip against the mating shaft or seal. Several of these seal designs have metal supports bonded to the elastomeric seal and are normally used to provide a member that can be pressed into a counter-bore or other types of cavities. One of the problems associated with these seals having metal supports is that the assembler will many times use a hammer, without a special seal driver, to press the seal into its installed position. This can result in the metal support being damaged due to the blows from the hammer. Some of these seals also have a second sealing surface that is spaced from the flexible lip. The second sealing surface needs to provide a secondary seal in the event there is some leakage in the lip seal. Known lip type seals having two different sealing surfaces (lips) either provide too much contact force on the surface of the installed shaft (rod) or not enough force. Too much contact force on the surface of the shaft (rod) results in a slight groove or recess being created thereon by wear between the sealing lips and the shaft (rod). Naturally, if the contact force is too small, the fluid being contained therein may leak out.

The present invention is directed to overcoming one or more of the problems as set forth above.

DISCLOSURE OF THE INVENTION

In one aspect of the present invention, a radial lip seal arrangement is provided. The lip seal arrangement defines a reference axis and is operative to seal the outer surface of a shaft to prevent leakage of fluid thereacross. The radial lip seal arrangement includes an elastomeric member having a body portion with a substantially linear peripheral surface oriented generally parallel to the reference axis, a radial surface substantially perpendicular to the reference axis, and first and second sealing portions spaced from each other along a line generally parallel to the reference axis of the shaft. The first sealing portion includes a lip portion extending from the body portion and defines a recess between the lip portion and a portion of the substantial linear peripheral surface. The lip portion has a radial surface that is generally perpendicular to the reference axis. The second sealing portion is formed by a first surface extending from the perpendicular radial surface of the body portion at an acute angle and a second surface that is generally perpendicular to the first surface. A metal support member is integrally attached to the body portion and has a first leg portion extending along the linear peripheral surface of the body portion and a second leg portion that extends along the perpendicular radial surface of the body portion. The second leg portion terminates at a location generally adjacent to the acute angle surface of the second sealing surface.

BRIEF DESCRIPTION OF THE DRAWINGS

FIG. 1 is an embodiment of the subject invention as installed in a member without a shaft or rod installed therein; and FIG. 2 is an embodiment of the subject invention with a shaft or rod installed therein.

BEST MODE FOR CARRYING OUT THE INVENTION

Referring to the drawings and more particularly to FIG. 1, a radial lip seal arrangement 10 is illustrated and disposed within a housing 11. The radial lip seal arrangement 10 has a reference axis 12 and includes an elastomeric member 14 and a metal support member 16. The metal support member 16 may be attached to the elastomeric member 14 by any conventional means such as, for example, by adhesively bonding or vulcanizing.

The elastomeric member 14 includes a body portion 18 having a substantially linear peripheral surface 20 and a radial surface 22. The linear peripheral surface 20 is spaced from and extends generally parallel with the reference axis 12. The radial surface 22 is generally perpendicular with the reference axis 12. In the subject embodiment, the radial surface 22 has a stepped portion 24 that extends outward from the body portion 18.

The elastomeric member 14 also includes first and second sealing portions 26,28. The first sealing portion 26 includes a lip portion 30. The lip portion 30 extends from the body portion 18 and defines a recess 31 between the lip portion 30 and a portion of the linear peripheral surface 20. The lip portion 30 has a radial surface 32 that is oriented perpendicular to the reference axis 12 and an innermost surface 34 disposed thereon at an acute angle with respect to the radial surface 32.

The second sealing portion 28 is formed by a first surface 36 extending from the perpendicular radial surface 22 of the body portion 18 and a second surface 38 that is generally perpendicular with the first surface 36. The second surface 38 intersects with the innermost surface 34 (third surface). The location of the bottom of the recess 31 is generally radially outward of the point of intersection of the second surface 38 and the innermost surface 34.

An acute angle is formed between the perpendicular face of the radial surface 22 of the body portion 18 and the first surface 36. It is recognized that the generally perpendicular relationship between the first surface 36 and the second surface 38 would include being perpendicular or within plus or minus ten degrees from perpendicular.

The metal support member 16 has a first leg portion 40 that extends along the linear peripheral surface 20 and a second leg portion 42 that extends along the perpendicular radial surface 22. In the subject embodiment, the second leg portion 42 is disposed within the stepped portion of the radial surface 22 and terminates at the step. The termination of the second leg 42 is generally adjacent to the first surface 36 of the second sealing portion 28. This point of termination provides back-up for the second sealing portion 28. By having the second leg 42 of the metal support member 16 disposed within the stepped portion 24, the outer surface of the second leg 42 is substantially aligned with the outer portion of the stepped portion 42.

Referring to FIG. 2, the housing 11 and the radial lip seal arrangement 10 are illustrated with a shaft (rod) 46 disposed through the lip seal arrangement 10 and the housing 11. It is recognized that the shaft 46 could be a slip fit within the housing 11 or have a slight clearance therebetween without departing from the essence of the subject invention. In either case, a lubricant is introduced or contained in the region between the housing 11 and the shaft 46 and must be sealed therein. It is further recognized that the shaft 46 must be sealed at the other end or at least the cavity containing the lubricant must be closed at the opposed end.

INDUSTRIAL APPLICABILITY

Once the shaft 46 is placed in its installed position, a lubricant is introduced into the area on the right side, as viewed in FIG. 2, of the lip seal arrangement 10. The lubricant can be introduced at atmospheric pressure or it can be introduced under a predetermined pressure. In either case the lip seal arrangement 10 functions to retain the lubricant therein.

From a review of FIG. 2, it is apparent that the lip portion 30 is forced to flex up, as viewed in the drawing, when the shaft 46 is installed. As the lip portion 30 is moved from its initial position, the orientation of the radial surface 32 on the lip portion changes to a position at which the radial surface 32 forms an acute angle with respect to a line perpendicular with the reference axis 12. This acute angle, following the insertion of the shaft 46, is normally within about twenty degrees. This relationship promotes sufficient force to maintain a minimum lubricant film to resist wear and prevent leakage but not enough force to cause severe damage or excess grooving to the shaft 46 which would result in leakage if the lubricant.

Upon insertion of the shaft 46, the second sealing portion 28 is forced to deform to provide the needed seal. During the deformation of the second sealing portion 28, the angle of the second surface 38 relative to the first surface 36 increases. The second sealing portion 28 not only aids in retaining the lubricant within the sealed portion its primarily acts to exclude contaminants from the sealed portion. Since the second leg 42 of the metal support member 16 provides a back-up or support behind the first surface 36, the deformation of the second sealing portion results in the angle of the second surface 38 changing. This results in the angle between the first surface 36 and the second surface 38 increasing to form a larger included angle than that prior to installing the shaft. In most arrangements this included angle would be an obtuse angle.

If any of the lubricant passes by the first sealing portion 26, it is stopped and contained by the second sealing portion 28.

From the foregoing, it is readily apparent that the subject radial lip seal arrangement 10 provides a seal arrangement that is easy to install and has a first sealing portion 26 that maintains a minimum lubricant film between the seal lip portion 30 and the shaft 46 to resist wear and leakage. Additionally, the second leg 42 of the metal support member 16 provides support behind at least a portion of the second sealing portion 28.

Other aspects, objects and advantages of the invention can be obtained from a study of the drawing, the disclosure and the appended claims.

What is claimed is:

1. A radial lip seal arrangement defining a reference axis and being operative to seal the outer surface of a shaft to prevent leakage of fluid therebetween, the radial lip seal arrangement comprising:

an elastomeric member having a body portion with a substantially linear peripheral surface oriented generally parallel to the reference axis, a radial surface substantially perpendicular to the reference axis, and first and second sealing portions spaced from each other along a line generally parallel to the reference axis, the first sealing portion includes a lip portion extending from the body portion and defines a recess between the lip portion and a portion of the substantial linear peripheral surface, the recess being positioned relative to the lip portion and the substantially linear peripheral surface so that the recess is interposed between the lip portion and the substantially linear peripheral surface, the lip portion has a radial surface that is generally perpendicular to the reference axis, the second sealing portion being formed by a first surface extending from the perpendicular radial surface of the body portion at an acute angle and a second surface that is generally perpendicular to the first surface; and a metal support member integrally attached to the body portion and having a first leg portion extending along the linear peripheral surface of the body portion and a second leg portion that extends along the perpendicular radial surface of the body portion and terminates at a location generally adjacent to the acute angled first surface of the second sealing portion.

2. The radial lip seal arrangement of claim 1 wherein the acute angle of the first surface of the second sealing portion is less than 45 degrees.

3. The radial lip seal arrangement of claim 2 wherein a third surface extends from the radial surface of the lip portion at an acute angle and intersects with the second surface of the second sealing portion.

4. The radial lip seal arrangement of claim 3 wherein the recess defined by the lip portion terminates at a location generally radially outward from the intersection of the second and third surfaces.

5. The radial lip seal arrangement of claim 4 in combination with a shaft wherein, as assembled, the radial surface of the lip portion forms an acute angle with respect to the reference axis.

6. The radial lip seal arrangement of claim 5 wherein, as assembled, the second surface of the second sealing portion forms an obtuse angle with the first surface thereof.

* * * * *